(No Model.) 2 Sheets—Sheet 1.
C. G. P. DE LAVAL.
DIFFERENTIAL PRESSURE REDUCING APPARATUS.
No. 587,150. Patented July 27, 1897.
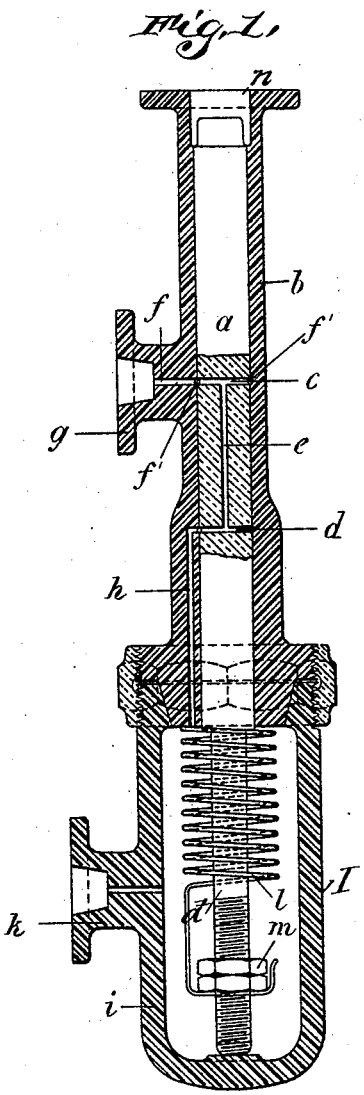

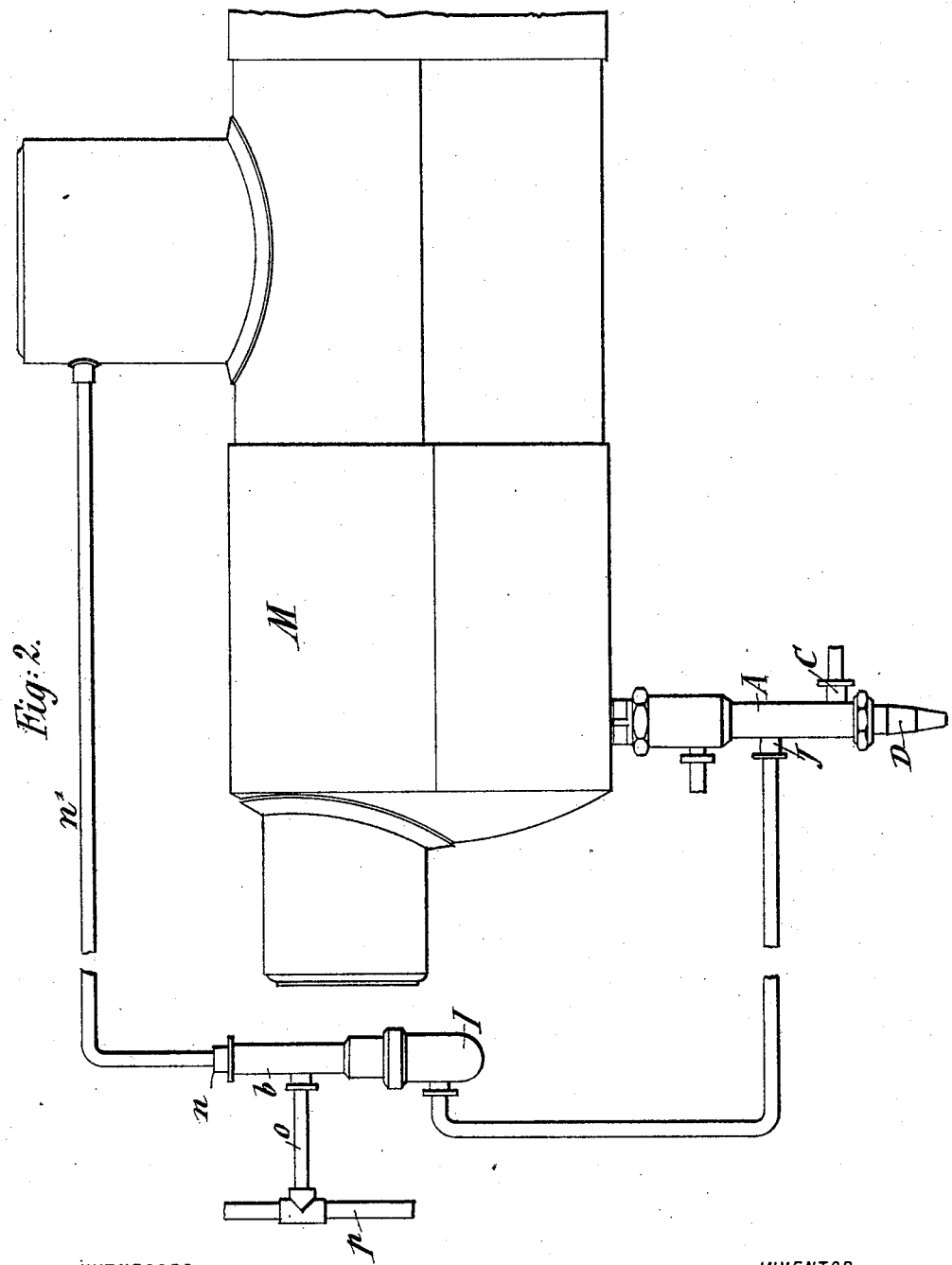

United States Patent Office.

CARL GUSTAF PATRIK DE LAVAL, OF STOCKHOLM, SWEDEN.

DIFFERENTIAL-PRESSURE-REDUCING APPARATUS.

SPECIFICATION forming part of Letters Patent No. 587,150, dated July 27, 1897.

Application filed January 22, 1895. Serial No. 535,817. (No model.)

*To all whom it may concern:*

Be it known that I, CARL GUSTAF PATRIK DE LAVAL, doctor of philosophy and engineer, of Mount Handtverkaregatan, Stockholm, Sweden, have invented certain new and useful Improvements in Differential-Pressure-Reducing Apparatus, of which the following is a specification.

For regulating the steam-admission to motors, such as steam turbines and the like, a piston may be employed which is movable in a cylinder, and in all positions being kept in equilibrium by the following pressures—namely, on one side by the available steam-pressure, and on the other side by the pressure of a fluid passing through the cylinder, together with the pressure of a spring, said piston being connected with the steam-admission organ, while the motor-governor is combined with a throttling device which determines the pressure upon the piston. As, however, during work the governor produces rather large variations in the fluid-pressure, the difference between the steam-pressure on one side of the piston and the liquid-pressure on the other side of the piston may become rather considerable, the consequence being a leakage of steam from the steam-space to the liquid-space. To avoid this inconvenience, the piston may be arranged as a double piston upon whose intermediate part water is let in, which is kept at a pressure which at any moment is either as high as the steam-pressure or somewhat lower or higher than it. By supposing such a counter-pressure at the intermediate part of the piston steam is prevented from leaking from the steam-space to the liquid-space, or vice versa.

Now the present invention refers to an apparatus for obtaining water under such a pressure as above mentioned and is intended to be coupled to a regulating apparatus such as above described—that is to say, the invention refers, in general, to an apparatus for automatically maintaining a previously-determined constant difference between the pressures of two fluids—for instance, steam and water—independent of the variations in pressure which may obtain in one or both of these fluids.

In the accompanying drawings, Figure 1 is a vertical longitudinal section of my improved differential-pressure-reducing apparatus, and Fig. 2 is a side view showing the same in connection with a steam-boiler.

A indicates a piston which is movable in the cylinder $b$. This piston is provided with two cross-passages $c$ and $d$, which communicate by means of a longitudinal passage $e$. The passage $c$ connects, by the passage $f$ in the cylinder $b$ and entering the branch pipe $g$, with a conduit from the feed-pump, while the passage $d$ communicates, by means of the longitudinal passage $h$ in the cylinder-wall, with a space $i$ in a separate piece I, below the cylinder $b$ or forming part thereof. This space has an an outlet $k$ for that water the pressure of which is kept at a certain and constant degree from the steam-pressure, and this outlet may be coupled to communicate with the intermediate part of the piston at J in the regulating apparatus above described for delivering water to the same under a pressure which is kept somewhat lower than the steam-pressure. The said regulating apparatus is covered and fully described in my Patent No. 569,834, dated October 20, 1896. The connection is fully shown in Fig. 2. A indicates the cylinder, C the inlet, and D the outlet, of said regulating apparatus. The piston $a$ is by a screw-threaded spindle part $a'$ continued into this space $i$ and is influenced by the spring $l$, which is fixed at its upper end and the pressure of which on the piston $a$ can be adjusted by the nuts $m$, screwed onto the spindle part.

The upper end of the cylinder $b$ forms a steam-inlet from the boiler. The water coming from the pump at a greater pressure than that of the steam acting upon the other end of the piston $a$, and the pressure of which is desired to be reduced in the manner stated, enters by $g\ f\ c\ e\ d\ h$ into the space $i$, filling it at last and flowing out by the outlet $k$; but as soon as the water-pressure on the piston $a$ rises so high that it, together with the pressure of the spring $l$ on the piston, overcomes the pressure of the steam on the other end of the piston the piston is shifted and the water-admission through $c\ e\ d$ is shut off or throttled. The pressure in the space $i$ then goes down until equilibrium is effected between, on the one hand, the steam-pressure on the upper end of the piston, and, on the other hand, the water-pressure, and that of the spring $l$ on the other end, provided that the outflow at $k$ is less than by fully-opened passages $c$ $e$ $d$.

M indicates the boiler of any suitable type, and $n'$ indicates the pipe that leads from the boiler to the steam-inlet $n$ at the top of the cylinder $b$.

$p$ is the conduit from the feed-pump to the boiler, while $o$ is the branch pipe which leads from said conduit to the inlet $g$, leading into the cylinder $b$.

On the drawings the piston $a$ has its lower position. For understanding the operation of the device it may be assumed that the piston occupies its middle position, thus throttling the passages $f$ and $h$ half. If now the water-pressure by $g$ tends to increase, the pressure in the space $i$ consequently increases and the piston $a$ is thus pushed upward, throttling the inlet until equilibrium is established. Vice versa, if the water-pressure by $g$ diminishes the pressure in the space $i$ consequently diminishes and the piston is pushed down, whereby the inlet is opened. In like manner the piston is pushed respectively up or down if the steam-pressure by $n$ falls or rises. The pressure in the space $i$ will thus by this arrangement, independently of the pressure variations of the water by $g$ or the steam by $n$, be kept so much lower than the steam-pressure by $n$ as is the upward pressure exerted by the spring $l$ at the lower end of the piston. As this spring-pressure may be regulated as desired by means of the nuts $m$, the pressure of the water passing through the apparatus described will be reduced to a pressure which is to a desired degree lower than the steam-pressure—that is to say, I attain a desired and constant difference.

The spring $l$ may of course be arranged on that side of the piston $a$ which is acted on by the steam, but the arrangement shown is probably preferable.

It should here be noted that as the desired difference between the pressure of the steam and water in the aforesaid arrangement is obtained by acting on the piston $a$ with a force which is just as great as this difference this force ought to be constant in the various positions of the piston, in so far as it is desired that the difference should be constant. It would therefore be more correct to load the piston with a weight instead of the spring $l$ or to make it so heavy that its own weight produces the required throttling of the water; but in order to alter easily the desired difference it may be more suitable to apply a spring $l$, which is made so long that the varying pressure exerted by the spring on the piston in the various positions of the latter has no material influence.

The pressure of the water flowing off through outlet $k$ to the intermediate part of the piston in my patent above referred to may of course in the apparatus described be kept somewhat higher than the steam-pressure by reversing the pressure action of the spring or weight.

In order to avoid a displacement of the piston $a$ and a jamming of same because of the pressure action of the inflowing water, in case the throttling device, as in the example shown, consists of the piston itself, (which for that purpose is provided with passages $c$ $d$, communicating with the water-inlet $g$ and with the space $i$,) the inlet-passage $f$ runs at right angles to the direction of motion of the piston and terminates symmetrically round the piston—that is to say, in an annular groove $f'$ in the cylinder. The piston thus becomes balanced and insensible to the inlet of the water.

When the apparatus above described has to be employed in connection with a regulating apparatus of the character referred to hereinbefore, the outlet $k$ is connected by means of a pipe with the intermediate part of the piston in the regulating apparatus. As the pressure on this water is somewhat lower than available steam-pressure acting evenly on the one side of the piston in said regulating apparatus, as before stated, the leakage of steam from the steam-space to the liquid-space in the regulating apparatus is avoided.

Having thus described my invention, I claim as new and desire to secure by Letters Patent—

1. In differential-pressure-reducing apparatus, the combination of a cylinder provided with an inlet-opening and an outlet-opening for the pressure liquid, a piston arranged to move in the cylinder and provided with throttling channels or passages which lead from the inlet-opening to the outlet-opening, and a spring or its equivalent adapted to act on said piston, said piston being on one side acted on by the steam-pressure and on the other side by the reduced pressure of the liquid, as well as by said spring or its equivalent, substantially as set forth.

2. In differential-pressure-reducing apparatus, the combination of a cylinder provided with an inlet and an outlet opening for the pressure liquid, and constructed in its wall with a longitudinal passage leading from the bore to the space from which the outlet-opening leads, a piston guided in the cylinder and having communicating transverse passages, one of which communicates with the liquid-inlet opening, while the other communicates with the longitudinal passage in the wall of the cylinder, and a spring or its equivalent influencing the movements of the piston, said piston being on one side acted on by the steam-pressure and on the other by the reduced pressure of the liquid, as well as by the force of said spring, substantially as set forth.

3. In differential-pressure-reducing apparatus, the combination of a cylinder, a piston guided in the cylinder and provided with throttling means, and a spring or its equivalent influencing the movements of the piston, said cylinder having liquid inlet and outlet openings, the former of which terminates symmetrically around the piston for the purpose of avoiding the jamming of the same, substantially as set forth.

In testimony that I claim the foregoing as my invention I have signed my name in presence of two subscribing witnesses.

CARL GUSTAF PATRIK DE LAVAL.

Witnesses:
 TYEKO ROBSAHM,
 WALDEMAR BOMAN.